United States Patent
Soga

(10) Patent No.: US 11,332,649 B2
(45) Date of Patent: May 17, 2022

(54) SURFACE MODIFIER COMPOSITION AND ADHESION METHOD

(71) Applicant: THREEBOND CO., LTD., Tokyo (JP)

(72) Inventor: Tetsunori Soga, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 72 days.

(21) Appl. No.: 16/651,024

(22) PCT Filed: Oct. 2, 2018

(86) PCT No.: PCT/JP2018/036867
§ 371 (c)(1),
(2) Date: Mar. 26, 2020

(87) PCT Pub. No.: WO2019/069915
PCT Pub. Date: Apr. 11, 2019

(65) Prior Publication Data
US 2020/0308460 A1    Oct. 1, 2020

(30) Foreign Application Priority Data

Oct. 6, 2017   (JP) .............................. JP2017-195896

(51) Int. Cl.
| | |
|---|---|
| C08F 2/46 | (2006.01) |
| C08F 2/50 | (2006.01) |
| C08G 61/04 | (2006.01) |
| C09J 183/04 | (2006.01) |
| C08F 279/02 | (2006.01) |
| C09D 4/00 | (2006.01) |
| C09D 143/04 | (2006.01) |
| C09D 183/04 | (2006.01) |
| C09J 5/02 | (2006.01) |
| C09J 5/06 | (2006.01) |
| C09J 109/00 | (2006.01) |
| C09J 123/22 | (2006.01) |
| C09J 133/00 | (2006.01) |

(52) U.S. Cl.
CPC ........... *C09J 183/04* (2013.01); *C08F 279/02* (2013.01); *C09D 4/00* (2013.01); *C09D 143/04* (2013.01); *C09D 183/04* (2013.01); *C09J 5/02* (2013.01); *C09J 5/06* (2013.01); *C09J 109/00* (2013.01); *C09J 123/22* (2013.01); *C09J 133/00* (2013.01)

(58) Field of Classification Search
CPC .... C09J 183/04; C09J 151/003; C09J 157/00; C09J 5/02; C09J 5/06; C09J 4/06; C09J 133/00; C09J 123/02; C09J 109/00; C09D 143/04; C09D 4/00; C09D 183/04; C09D 5/00; C08F 283/126; C08F 283/122; C08F 2980/042; C08F 2/48; C08F 279/02; C08F 230/085; C08F 220/1811
USPC ........... 522/46, 33, 6, 189, 184, 71, 1; 520/1
See application file for complete search history.

(56) References Cited

U.S. PATENT DOCUMENTS

| | | | | |
|---|---|---|---|---|
| 5,776,565 | A * | 7/1998 | Volpe | ........................ B32B 9/04 428/34.2 |
| 8,771,462 | B2 * | 7/2014 | Sjong | .................. C08G 83/008 156/712 |
| 2008/0138546 | A1 | 6/2008 | Soria et al. | |
| 2013/0048338 | A1 | 2/2013 | Suzuki et al. | |
| 2015/0024648 | A1 | 1/2015 | Landa et al. | |

FOREIGN PATENT DOCUMENTS

| | | | |
|---|---|---|---|
| CN | 103702828 A | 4/2014 | |
| DE | 102005034121 A1 * | 8/2006 | .......... C09D 183/10 |
| EP | 0501055 A1 * | 9/1992 | .............. C09D 4/00 |
| EP | 0501055 A1 | 9/1992 | |
| EP | 2851397 A1 | 3/2015 | |
| JP | S54-133585 A | 10/1979 | |
| JP | S57-195108 A | 11/1982 | |
| JP | S57195108 * | 11/1982 | |
| JP | H05-456 A | 1/1993 | |
| JP | H05-98218 A | 4/1993 | |
| JP | 2000-109584 A | 4/2000 | |
| JP | 2010-512558 A | 4/2010 | |
| JP | 2011-013607 A | 1/2011 | |

(Continued)

OTHER PUBLICATIONS

Yukihiko et al, JPS57195108 Machine Translation, Nov. 30, 1982 (Year: 1982).*
Reinthaler et al (DE 102005034121 Machine Translation, Aug. 17, 2006 (Year: 2006).*
PCT, International Search Report for the corresponding patent application No. PCT/JP2018/036867, dated Nov. 13, 2018, with English translation (5 pages).

(Continued)

*Primary Examiner* — Jessica Whiteley
(74) *Attorney, Agent, or Firm* — Lucas & Mercanti, LLP

(57) ABSTRACT

An object of the present invention is to provide a surface modifier composition that is capable of performing surface modification of various types of hardly adhesive materials, and of improving adhesion with respect to various types of hardly adhesive materials, and an adhesion method using the same. The present invention relates to a surface modifier composition, containing: an (A) component: a hydrogen abstraction type radical initiator; a (B) component: a silane compound having a hydrolyzable silyl group, and one or more functional groups which are at least one type of functional group selected from the group consisting of radical polymerizable functional groups and mercapto groups; and a (C) component: at least one compound selected from the group consisting of a (C1) specific silane compound and a (C2) condensation reaction catalyst, in which the surface modifier composition is used in surface modification of an adherend containing a resin having a hydrocarbon bond.

12 Claims, No Drawings

(56) References Cited

FOREIGN PATENT DOCUMENTS

| JP | 2013-040291 A | 2/2013 |
|----|---------------|--------|
| JP | 2013-065553 A | 4/2013 |

OTHER PUBLICATIONS

PCT, Written Opinion of the International Searching Authority for the corresponding patent application No. PCT/JP2018/036867, dated Nov. 13, 2018 (5 pages).

CNIPA, Office Action for the corresponding Chinese patent application No. 201880065365.9, dated Jun. 21, 2021, with English translation.

EPO, Extended European Search Report for the corresponding European patent application No. 18865119.4, dated Apr. 16, 2021.

Wouters et al., "Transparent UV curable antistatic hybrid coatings on polycarbonate prepared by the sol-gel method," Progress in Organic Coatings, Dec. 20, 2004, pp. 312-319, vol. 51, No. 4, ELSEVIER, The Netherlands.

Jain S et al., "Synthetic aspects and characterization of polypropylene-silica nanocomposites prepared via solid-state modification and sol-gel reactions," POLYMER, Aug. 8, 2005, pp. 6666-6681, vol. 46, No. 17, Elsevier Science Publishers B.V, Great Britain.

Balbay Senay et al., "Influence of silane on the structure of polystyrene prepared by sol-gel coatings via UV curing," E3S Web of Conferences, Jan. 1, 2017, p. 00007, vol. 22.

Yin Changjie et al: "Preparation, properties of In-situ silica modified styrene-butadiene rubber and its silica-filled composites," Polymer Composites, Jan. 5, 2016, pp. 22-28, vol. 39, No. 1.

CNIPA, Office Action for the corresponding Chinese patent application No. 201880065365.9, dated Mar. 1, 2022, with English translation.

* cited by examiner

SURFACE MODIFIER COMPOSITION AND ADHESION METHOD

CROSS REFERENCE TO RELATED APPLICATION

This Application is a 371 of PCT/JP2018/036867 filed on Oct. 2, 2018 which, in turn, claimed the priority of Japanese Patent Application No. 2017-195896 filed on Oct. 6, 2017, both applications are incorporated herein by reference.

TECHNICAL FIELD

The present invention relates to a surface modifier composition and an adhesion method.

BACKGROUND ART

PP (polypropylene), PE (polyethylene), and the like are chemically stable, and surface polarity thereof is small, and thus, PP, PE, and the like are known as a hardly adhesive material in which the wettability of a resin surface is poor, and it is difficult to perform adhesion by an adhesive agent or the like. In addition, surface modification is known as means for allowing such a hardly adhesive material to exhibit an adhesive force. Examples of a representative method of the surface modification include a method of modifying the surface of the hardly adhesive material by a plasma treatment, a corona treatment, an ultraviolet ray irradiation treatment, an ozone treatment, a flame treatment, and the like, a method of performing modification by allowing the surface of the hardly adhesive material to be covered with a surface modifier having excellent wettability with respect to the hardly adhesive material, and the like.

In JP 2000-109584 A, a method in which in a state where a treatment subject, a compound that is capable of generating radicals having a desired functional group, and a solution containing a hydrohalic acid and/or halogen water are in contact with each other, a hydrogen abstraction reaction of materials is started by applying energy to the solution, and the radicals having a functional group and carbons are bonded is disclosed as a surface modification method.

SUMMARY OF INVENTION

However, in JP 2000-109584 A, verification is performed with respect to surface modification of polyethylene and polypropylene, but verification is not performed at all with respect to other hardly adhesive materials such as SPS and nylon.

Therefore, an object of the present invention is to provide a surface modifier composition that is capable of performing surface modification of various types of hardly adhesive materials, and of improving adhesion with respect to various types of hardly adhesive materials, and an adhesion method using the same.

The object of the present invention can be attained by the following means.

A surface modifier composition, containing: an (A) component: a hydrogen abstraction type radical initiator; a (B) component: a silane compound having a hydrolyzable silyl group, and one or more functional groups which are at least one type of functional group selected from the group consisting of radical polymerizable functional groups and mercapto groups; and a (C) component: at least one compound selected from the group consisting of a (C1) silane compound represented by Formula 1 described below and a (C2) condensation reaction catalyst, in which the surface modifier composition is used in surface modification of an adherend containing a resin having a hydrocarbon bond:

[Chemical formula 1]

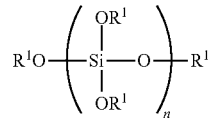

Formula 1

In Formula 1 described above, n represents an integer of 1 to 10, and R's each independently represent an alkyl group having 1 to 20 carbon atoms.

DESCRIPTION OF EMBODIMENTS

Hereinafter, an embodiment of the present invention will be described. Note that, the present invention is not limited to the following embodiment. Herein, "X to Y" indicating a range includes X and Y, and indicates "greater than or equal to X and less than or equal to Y". In addition, unless otherwise specified, an operation and measurement of physical properties or the like are performed in a condition of room temperature (20° C. to 25° C.)/relative humidity of 40% RH to 50% RH.

In addition, "(meth)acrylate" is a generic term for acrylate and methacrylate. Similarly, a compound or the like having (meth) in a name, such as a (meth)acrylic acid, is a generic term for a compound having "meth" in a name and a compound not having "meth" in a name.

One aspect of the present invention relates to [1] described below.

[1] A surface modifier composition, containing: an (A) component: a hydrogen abstraction type radical initiator; a (B) component: a silane compound having a hydrolyzable silyl group, and one or more functional groups which are at least one type of functional group selected from the group consisting of radical polymerizable functional groups and mercapto groups; and a (C) component: at least one compound selected from the group consisting of a (C1) silane compound represented by Formula 1 described above and a (C2) condensation reaction catalyst, in which the surface modifier composition is used in surface modification of an adherend containing a resin having a hydrocarbon bond, and in Formula 1 described above, n represents an integer of 1 to 10, and R's each independently represent an alkyl group having 1 to 20 carbon atoms.

According to the surface modifier composition for an adherend according to this aspect, it is possible to perform surface modification of various types of hardly adhesive materials, and to improve adhesion with respect to various types of hardly adhesive materials. In addition, the surface modification is performed by the surface modifier composition for an adherend according to this aspect, and thus, the adhesion can be improved regardless of the type of adhesive agent such as a heat-curable adhesive agent, an active energy ray-curable adhesive agent, a moisture-curable adhesive agent, and a hot-melt adhesive agent.

In addition, the present invention includes an embodiment according to [2] to [14] described below, as a non-limiting example of a preferred aspect.

[2] The surface modifier composition according to [1], in which the (C) component contains the (C1) silane compound represented by Formula 1 described above.
[3] The surface modifier composition according to [1] or [2], in which the (C) component contains the (C1) silane compound represented by Formula 1 described above and the (C2) condensation reaction catalyst.
[4] The surface modifier composition according to any one of [1] to [3], in which the (C2) condensation reaction catalyst is a tin catalyst or a titanium catalyst.
[5] The surface modifier composition according to any one of [1] to [4], in which the (A) component is a hydrogen abstraction type photoradical initiator.
[6] The surface modifier composition according to any one of [1] to [5], in which the (A) component is at least one selected from the group consisting of a benzophenone-based photoradical polymerization initiator, an aminobenzophenone-based photoradical polymerization initiator, a thioxanthone-based photoradical polymerization initiator, and methyl benzoylformate.
[7] The surface modifier composition according to any one of [1] to [6], in which the surface modifier composition contains the (C) component in a range of greater than or equal to 0.05 parts by mass and less than or equal to 50 parts by mass, with respect to 1 part by mass of the (B) component.
[8] The surface modifier composition according to any one of [1] to [7], further containing: a solvent as a (D) component.
[9] The surface modifier composition according to any one of [1] to [8], in which the resin having a hydrocarbon bond includes at least one selected from the group consisting of PP (polypropylene), PE (polyethylene), PET (polyethylene terephthalate), SPS (syndiotactic polystyrene), PEN (polyethylene naphthalate), PBT (polybutylene terephthalate), PPE (polyphenylene ether), PPS (polyphenylene sulfide), EPDM (ethylene propylene diene rubber), an LCP (a liquid crystal polymer), a cycloolefin polymer, PC (polycarbonate), 6,6-nylon, polyacetal, polyamide, polyvinyl chloride, and a silicone resin.
[10] The surface modifier composition according to any one of [1] to [9], in which the surface modifier composition contains the (B) component in a range of greater than or equal to 0.01 parts by mass and less than or equal to 500 parts by mass, with respect to 1 part by mass of the (A) component.
[11] An adhesion method, including: performing a surface treatment by a method including applying the surface modifier composition according to any one of [1] to [10] onto adhesion target surfaces of one or both of two adherends to form a surface modifier composition coating layer, and heating the surface modifier composition coating layer or irradiating the surface modifier composition coating layer with an active energy ray; and then forming an adhesive agent layer by applying an adhesive agent onto at least one of the adhesion target surfaces, pasting the two adherends through the adhesive agent layer such that the adhesion target surfaces of the two adherends face each other, and then, curing the adhesive agent layer by heating the adhesive agent layer or by irradiating the adhesive agent layer with an active energy ray.
[12] The adhesion method according to [11], in which the adhesive agent is a heat-curable adhesive agent containing a curable vinylic polymer or curable polyorganosiloxane, or an active energy ray-curable adhesive agent.
[13] The adhesion method according to [12], in which the curable vinylic polymer is at least one or more types selected from the group consisting of a curable (meth)acrylic polymer, curable polybutadiene, curable hydrogenated polybutadiene, curable polyisoprene, curable hydrogenated polyisoprene, and curable polyisobutylene.
[14] A member including: an adherend containing a resin having a hydrocarbon bond, which is subjected to surface modification by the surface modifier composition according to any one of [1] to [10].

Hereinafter, the details of the present invention will be described.

A surface modifier composition is a composition having a function of performing surface modification of an adherend, and of improving adhesion with respect to an adhesive agent. In addition, a surface modifier is also referred to as a primer.

<(A) Component>

A surface modifier composition according to one embodiment of the present invention contains an (A) component: a hydrogen abstraction type radical initiator.

The (A) component is not particularly limited insofar as the component is the hydrogen abstraction type radical initiator, and examples of the component include a hydrogen abstraction type photoradical initiator, a hydrogen abstraction type heating radical initiator, and the like. Among them, the hydrogen abstraction type photoradical initiator is preferable from the viewpoint of performing surface modification immediately by the irradiation of an active energy ray.

The hydrogen abstraction type photoradical initiator is not particularly limited, and examples of the hydrogen abstraction type photoradical initiator include a photoradical polymerization initiator that causes a hydrogen abstraction reaction by the active energy ray such as ultraviolet ray irradiation through a triplet excited state, and generates radicals, and the like. Here, the active energy ray includes all light rays in a broad sense, such as a radioactive ray such as an α ray or a β ray, an electromagnetic wave such as a γ ray or an X ray, an electron beam (EB), an ultraviolet ray of a wavelength of approximately 100 nm to 400 nm, and a visible light ray of a wavelength of approximately 400 nm to 800 nm. Among them, the ultraviolet ray is preferable.

In addition, the (A) component is combined with other components of the present invention, and thus, has a striking effect of enabling surface modification of a hardly adhesive material to be performed and adhesion to be improved. It is considered that this is because the (A) component is irradiated with light, and thus, hydrogen is abstracted from the surface of an adherend of the hardly adhesive material, and the activated adherend reacts with a (B) component described below, and therefore, adhesion on the interface is improved.

The hydrogen abstraction type photoradical initiator is not particularly limited, and examples of the hydrogen abstraction type photoradical initiator include a benzophenone-based photoradical polymerization initiator, an aminobenzophenone-based photoradical polymerization initiator, a thioxanthone-based photoradical polymerization initiator, methyl benzoylformate, and the like. That is, it is preferable that the (A) component is at least one selected from the group consisting of a benzophenone-based photoradical polymerization initiator, an aminobenzophenone-based photoradical polymerization initiator, a thioxanthone-based photoradical polymerization initiator, and methyl benzoylformate. Among them, the benzophenone-based photoradical polymerization initiator is particularly preferable from the viewpoint of enabling the effect of performing the surface modification with respect to the hardly adhesive material and of improving the adhesion to be more markedly obtained.

The benzophenone-based photoradical polymerization initiator is not particularly limited, and examples of the benzophenone-based photoradical polymerization initiator include benzophenone, 2-methyl benzophenone, 3-methyl benzophenone, 2-ethyl benzophenone, 3-ethyl benzophenone, 4-methyl benzophenone, 4-ethyl benzophenone, 4-bromobenzophenone, 4-chlorobenzophenone, 4,4'-dichlorobenzophenone, 4-chloro-4'-benzyl benzophenone, 4,4'-dimethoxybenzophenone, 3-methoxybenzophenone, 2,4,6-trimethyl benzophenone, 3,3'-dimethyl-4-methoxybenzophenone, 4-cyanobenzophenone, a derivative obtained by increasing a molecular weight thereof, and the like. Among them, the benzophenone is particularly preferable.

The aminobenzophenone-based photoradical polymerization initiator is not particularly limited, and examples of the aminobenzophenone-based photoradical polymerization initiator include 4,4'-diethyl aminobenzophenone, a derivative obtained by increasing a molecular weight thereof, and the like.

The thioxanthone-based photoradical polymerization initiator is not particularly limited, and examples of the thioxanthone-based photoradical polymerization initiator include 2-isopropyl thioxanthone, 2,4-dimethyl thioxanthone, 2,4-diethyl thioxanthone, a derivative obtained by increasing a molecular weight thereof, and the like.

A synthetic product may be used as the hydrogen abstraction type photoradical initiator, or a commercially available product may be used.

Examples of a commercially available product of the benzophenone-based photoradical polymerization initiator include SB-PI 710, SB-PI 712 (manufactured by Shuang Bang Industrial Corp.), a reagent such as a benzophenone reagent (for example, manufactured by Wako Pure Chemical Industries, Ltd.), GENOPOL BP-1 (manufactured by RAHN AG.), and the like. Examples of a commercially available product of the aminobenzophenone-based photoradical polymerization initiator include SB-PI 701 (manufactured by Shuang Bang Industrial Corp.), and the like. In addition, examples of the thioxanthone-based photoradical polymerization initiator include KAYACURE (Registered Trademark) DETX-S (manufactured by Nippon Kayaku Co., Ltd.), GENOPOL TX-1 (manufactured by RAHN AG.), and the like. In addition, examples of methyl benzoylformate include SPEEDCURE (Registered Trademark) MBF (manufactured by Lambson Ltd.), and the like.

Each of the hydrogen abstraction type photoradical initiators may be independently used, or two or more types thereof may be used by being mixed.

The hydrogen abstraction type heating radical initiator is not particularly limited, and examples of the hydrogen abstraction type heating radical initiator include a peroxide such as dicumyl peroxide and benzoyl peroxide, and the like. Among them, a hydrogen abstraction type heating radical initiator that is cleaved to generate t-butoxyradicals. Specifically, t-butyl peroxyacetate, di-t-butyl peroxide, t-butyl peroxybenzoate, t-butyl peroxyisopropyl carbonate, 1,1-bis-(t-butyl peroxy)-3,3,5-trimethyl cyclohexane, t-butyl (2-ethyl hexanoyl) peroxide, and the like are exemplified. A synthetic product may be used as the hydrogen abstraction type heating radical initiator, or a commercially available product may be used, and examples of the commercially available product thereof include PERBUTYL (Registered Trademark) C, PERBUTYL (Registered Trademark) D, PERBUTYL (Registered Trademark) ND, PERBUTYL (Registered Trademark) O, PERBUTYL (Registered Trademark) L, PERBUTYL (Registered Trademark) Z, and PERBUTYL (Registered Trademark) P (manufactured by NOF CORPORATION), and the like. Each of the hydrogen abstraction type heating radical initiators may be independently used, or two or more types thereof may be used by being mixed.

In addition, only the hydrogen abstraction type photoradical initiator or the hydrogen abstraction type heating radical initiator may be used as the hydrogen abstraction type photoradical initiator, or the hydrogen abstraction type photoradical initiator and the hydrogen abstraction type heating radical initiator may be used by being mixed.

<(B) Component>

The surface modifier composition according to one embodiment of the present invention contains a (B) component: a silane compound having a hydrolyzable silyl group, and one or more functional groups which are at least one type of functional group selected from the group consisting of radical polymerizable functional groups and mercapto groups. Among them, a silane compound having a hydrolyzable silyl group and one or more radical polymerizable functional groups is preferable, and a silane compound having a hydrolyzable silyl group and one radical polymerizable functional group is more preferable.

The radical polymerizable functional group is not particularly limited, and examples of the radical polymerizable functional group include an ethylenically unsaturated group such as a (meth)acryloyl group, an allyl group, and a vinyl group. Among them, the (meth)acryloyl group is preferable from the viewpoint of having excellent compatibility with respect to the radicals generated by the (A) component of the present invention and excellent curing properties.

Specific examples of the (B) component include 3-methacryloxypropyl methyl dimethoxysilane, 3-methacryloxypropyl trimethoxysilane, 3-methacryloxypropyl methyl diethoxysilane, 3-methacryloxypropyl triethoxysilane, 3-acryloxypropyl trimethoxysilane, allyl trimethoxysilane, vinyl trimethoxysilane, vinyl triethoxysilane, p-styryl trimethoxysilane, a silicone oligomer having a (meth)acryloyl group, a silicone oligomer having a vinyl group, 3-mercapto propyl methyl dimethoxysilane, 3-mercapto propyl trimethoxysilane, and the like, but are not limited thereto. Among them, 3-methacryloxypropyl methyl dimethoxysilane, 3-methacryloxypropyl trimethoxysilane, 3-methacryloxypropyl methyl diethoxysilane, 3-methacryloxypropyl triethoxysilane, 3-acryloxypropyl trimethoxysilane, which are a silane compound having one or more (meth)acryloyl groups, as the radical polymerizable functional group, are preferable, 3-methacryloxypropyl trimethoxysilane and 3-acryloxypropyl trimethoxysilane are more preferable, and 3-methacryloxypropyl trimethoxysilane is even more preferable.

A synthetic product may be used as the silane compound having a hydrolyzable silyl group, and one or more functional groups which are at least one type of functional group selected from the group consisting of radical polymerizable functional groups and mercapto groups, or a commercially available product may be used. Examples of the commercially available product include KBM-503, KBM-5103, KBM-802, and KBM-1003 (manufactured by Shin-Etsu Chemical Co., Ltd.), and the like.

Each of the silane compounds having a hydrolyzable silyl group, and one or more functional groups which are at least one type of functional group selected from the group consisting of radical polymerizable functional groups and mercapto groups may be independently used, or two or more types thereof may be used by being mixed.

An added amount of the (B) component is not particularly limited, but is preferably in a range of greater than or equal to 0.01 parts by mass and less than or equal to 500 parts by mass, is more preferably in a range of greater than or equal to 0.05 parts by mass and less than or equal to 300 parts by mass, is even more preferably in a range of greater than or equal to 0.1 parts by mass and less than or equal to 100 parts by mass, is still even more preferably in a range of greater than or equal to 0.5 parts by mass and 20 parts by mass, and is particularly preferably in a range of greater than or equal to 1 part by mass and less than or equal to 10 parts by mass, with respect to 1 part by mass of the (A) component. The added amount is in the range described above, and thus, it is possible to more rapidly perform the surface modification by an active energy ray or heating.

<(C) Component>

The surface modifier composition according to one embodiment of the present invention contains a (C) component: at least one compound selected from the group consisting of a (C1) silane compound represented by Formula 1 described below and a (C2) condensation reaction catalyst. It is possible to maintain a state in which the hardly adhesive member is subjected to the surface modification, by the (C) component. It is preferable that the (C) component contains the (C1) silane compound represented by Formula 1 described below, and it is particularly preferable that the (C1) silane compound represented by Formula 1 described below and the (C2) condensation reaction catalyst are used together, from the viewpoint of enabling a film formation speed to be improved.

[Chemical formula 2]

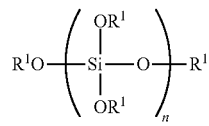

Formula 1

In Formula 1 described above, n represents an integer of 1 to 10, and R's each independently represent an alkyl group having 1 to 20 carbon atoms. Here, it is preferable that R's each independently represent an alkyl group having 1 to 10 carbon atoms. The alkyl group represented by $R^1$ is not particularly limited, and examples of the alkyl group include a linear, branched, or cyclic alkyl group such as a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, a cyclohexyl group, an n-heptyl group, an n-octyl group, and a 2-ethyl hexyl group. Among them, the methyl group or the ethyl group is particularly preferable. In addition, the range of n is preferably 2 to 7, is more preferably 3 to 6, and is particularly preferably 4 or 5, from the viewpoint of a curing speed of a surface modified layer.

The (C1) silane compound represented by Formula 1 described above is not particularly limited, and examples of the silane compound include tetramethoxysilane, tetraethoxysilane, tetra-n-butoxysilane, tetraisopropoxysilane, a hydrolysis condensate oligomer thereof, and the like. Among them, the hydrolysis condensate oligomer of tetramethoxysilane or the hydrolysis condensate oligomer of tetraethoxysilane is preferable, and the hydrolysis condensate oligomer of tetraethoxysilane is more preferable, from the viewpoint of a curing speed of a surface modifier.

Each of the (C1) silane compounds represented by Formula 1 described above may be independently used, or two or more types thereof may be used by being mixed.

The (C2) condensation reaction catalyst is not particularly limited, and examples of the condensation reaction catalyst include a tin catalyst, a titanium catalyst, a zirconium catalyst, a zinc catalyst, and the like, having catalyst activity in a dehydrated or dealcoholized condensation reaction.

Specific examples of the tin catalyst include dibutyl tin dilaurate, dibutyl tin oxide, dibutyl tin diacetate, dibutyl tin distearate, dibutyl tin laurate oxide, dibutyl tin diacetyl acetonate, dibutyl tin dioleyl malate, dibutyl tin octoate, dioctyl tin oxide, dioctyl tin dilaurate, and the like, but are not limited thereto.

Specific examples of the titanium catalyst include an alkoxide-based titanium catalyst such as titanium tetraisopropoxide, titanium tetranormal butoxide (normal-tetrabutoxytitanium, tetranormal butoxytitanium), a titanium butoxide dimer, and titanium tetra-2-ethyl hexoxide; a chelate-based titanium complex such as titanium diisopropoxybis(acetyl acetonate), titanium tetraacetyl acetonate, titanium dioctyloxybis(octylene glycol), and titanium diisopropoxybis(ethyl acetoacetate); an acylate-based titanium complex such as polyhydroxytitanium stearate, and the like, but are not limited thereto.

Specific examples of the zirconium catalyst include an alkoxide-based zirconium catalyst such as zirconium tetranormal propoxide, and zirconium tetranormal butoxide; a chelate-based zirconium catalyst such as zirconium tetraacetyl acetonate, zirconium tributoxymonoacetyl acetonate, zirconium monobutoxyacetyl acetonate bis(ethyl acetoacetate), zirconium dibutoxybis(ethyl acetoacetate), and zirconium tetraacetyl acetonate, and the like, but are not limited thereto.

Specific examples of the zinc catalyst include zinc octylate, zinc naphthenate, a zinc hexacyanocobaltate complex, a 1-methyl imidazole-bis(2-hexanoate) zinc complex, and the like, but are not limited thereto.

Among them, the tin catalyst or the titanium catalyst is preferable, the titanium catalyst is more preferable, the alkoxide-based titanium catalyst is even more preferable, and titanium tetranormal butoxide (normal-tetrabutoxytitanium) is particularly preferable, from the viewpoint of the curing speed of the surface modified layer.

Each of the (C2) condensation reaction catalysts may be independently used, or two or more types thereof may be used by being mixed.

An added amount of the (C) component is not particularly limited, but is preferably in a range of greater than or equal to 0.05 parts by mass and less than or equal to 50 parts by mass, is more preferably in a range of greater than or equal to 0.07 parts by mass and less than or equal to 40 parts by mass, is even more preferably in a range of greater than or equal to 0.1 parts by mass and less than or equal to 30 parts by mass, is still even more preferably in a range of greater than or equal to 0.2 parts by mass and less than or equal to 15 parts by mass, and is particularly preferably in a range of greater than or equal to 0.3 parts by mass and less than or equal to 10 parts by mass, with respect to 1 part by mass of the (B) component. The added amount of the (C) component is in the range described above, and thus, it is possible to more rapidly perform the surface modification by an active energy ray or heating, and to further perform the surface modification of the hardly adhesive material.

In a case where the (C1) component and the (C2) component are used together, an added amount of the (C2) component with respect to 1 part by mass of an added amount of the (C1) component is preferably in a range of greater than or equal to 0.01 parts by mass and less than or equal to 50 parts by mass, is more preferably in a range of greater than or equal to 0.05 parts by mass and less than or equal to 30 parts by mass, is even more preferably in a range of greater than or equal to 0.1 parts by mass and less than or equal to 20 parts by mass, and is still even more preferably in a range of greater than or equal to 0.2 parts by mass and less than or equal to 15 parts by mass. A blending ratio of the (C1) component and the (C2) component is in the range described above, and thus, it is possible to further perform the surface modification of the hardly adhesive material.

<(D) Component>

It is preferable that the surface modifier composition according to one embodiment of the present invention further contains a (D) component: a solvent. It is possible to further decrease a viscosity, and to make a coating operation easier, by the (D) component.

The (D) component is not particularly limited insofar as the component is a solvent that is compatible with the (A) component to the (C) component, and known solvents can be suitably selected and used as the solvent. Among them, a solvent having low polarity is preferable from the viewpoint of maintaining more excellent surface modification properties. Specific examples of the (D) component include a solvent having low polarity, such as hexane, cyclohexane, toluene, xylene, methyl cyclohexane, ethyl cyclohexane, and the like, but are not limited thereto. Among them, methyl cyclohexane and ethyl cyclohexane are preferable, and ethyl cyclohexane is more preferable. Each of the (D) components: the solvents may be independently used, or two or more types thereof may be used by being mixed.

An added amount of the (D) component is not particularly limited, but is preferably in a range of greater than or equal to 1 part by mass and less than or equal to 500 parts by mass, is more preferably in a range of greater than or equal to 2 parts by mass and less than or equal to 100 parts by mass, is even more preferably in a range of greater than or equal to 3 parts by mass and less than or equal to 50 parts by mass, and is particularly preferably in a range of greater than or equal to 4 parts by mass and less than or equal to 25 parts by mass, with respect to a total amount of 1 part by mass of the (A) component and the (B) component. The added amount of the (D) component is in the range described above, and thus, it is possible to make the viscosity of the surface modifier composition lower and the coating operation easier, and to maintain more excellent surface modification properties of the hardly adhesive material.

<Other Components to be Arbitrarily Added>

The surface modifier composition according to one embodiment of the present invention may be blended with a suitable amount of other components such as a coloring agent such as a pigment and a colorant, an inorganic filler such as a metal powder, calcium carbonate, talc, fumed silica, alumina, and aluminum hydroxide, a flame retarder, an organic filler, a diluent, a plasticizer, an antioxidant, an antifoaming agent, a leveling agent, and a rheology control agent, within a range not impairing the properties of the present invention. Such components are added, and thus, it is possible to obtain a composition excellent in desired properties such as a resin strength, an adhesion strength, operability, and preservability, and a cured material thereof.

The fumed silica can be blended in order to adjust the viscosity of the surface modifier composition or to improve a mechanical strength of the cured material. For example, fumed silica that is subjected to a hydrophobizing treatment by organochlorosilanes, polyorganosiloxane, hexamethyl disilazane, and the like can be preferably used. Specific examples of the fumed silica are not particularly limited, and include AEROSIL (Registered Trademark) R974, R972, R972V, R972CF, R805, R812, R812S, R816, R8200, RY200, RX200, RY200S, and R202 (Product Name, manufactured by NIPPON AEROSIL CO., LTD.), and the like, as commercially available product.

A filling material of the organic powder is not particularly limited, and examples of the filling material include polyethylene, polypropylene, nylon, acryl, polystyrene, polyester, polyvinyl alcohol, polyvinyl butyral, polycarbonate, and the like.

In addition, a curing agent, a curing accelerator, a curing catalyst, and the like, contained in an adhesive agent that is used in the adhesion of the hardly adhesive material, are added to the surface modifier composition according to one embodiment of the present invention, and thus, it is possible to use the surface modifier composition according to one embodiment of the present invention, as a primer.

<Manufacturing Method of Surface Modifier Composition>

The surface modifier composition according to one embodiment of the present invention can be manufactured by a known method of the related art. For example, the surface modifier composition can be manufactured by blending and mixing a predetermined amount of each of the components including the (A) component to the (C) component. Mixing means is not particularly limited, but known mixing means can be used, and for example, a stirrer such as a mixer can be used as the mixing means. A mixing temperature is not particularly limited, but is preferably a temperature of 10° C. to 70° C., is more preferably a temperature of 10° C. to 40° C., is even more preferably a temperature of 20° C. to 30° C., and is particularly preferably a temperature of 20° C. to 25° C. A mixing time is not particularly limited, but is preferably 0.1 hours to 5 hours, is more preferably 0.3 hours to 3.5 hours, is even more preferably 0.5 hours to 2 hours. In addition, it is preferable that the mixing of each of the components is performed under a light-shielded condition.

<Hardly Adhesive Material>

It is preferable that the hardly adhesive material that can be subjected to a surface treatment by the surface modifier composition according to one embodiment of the present invention contains a resin having a hydrocarbon bond, from the viewpoint of easily abstracting hydrogen from the surface of the adherend by the (A) component. Note that, the hydrocarbon bond is a C—H bond. The resin having a hydrocarbon bond is not particularly limited, and examples of the resin include PP (polypropylene), PE (polyethylene), PET (polyethylene terephthalate), SPS (syndiotactic polystyrene), PEN (polyethylene naphthalate), PBT (polybutylene terephthalate), PPE (polyphenylene ether), PPS (polyphenylene sulfide), EPDM (ethylene propylene diene rubber), LCP (a liquid crystal polymer), a cycloolefin polymer, PC (polycarbonate), nylon (for example, 6,6-nylon or the like), polyacetal, polyamide, polyvinyl chloride, a silicone resin, and the like. Note that, examples of a resin not having a C—H bond include polytetrafluoroethylene and the like.

Here, it is preferable that the surface modifier composition according to one embodiment of the present invention has the effect of enabling the adhesion to be further improved when the resin having a hydrocarbon bond, contained in the adherend, includes at least one selected from the group consisting of PP, PE, PET, SPS, PEN, PBT, PPE, PPS, EPDM, LCP, cycloolefin polymer, PC, nylon (for example, 6,6-nylon), polyacetal, polyamide, polyvinyl chloride, and the silicone resin, and the adherend is subjected to the surface treatment.

In other words, the surface modifier composition according to one embodiment of the present invention is capable of further improving adhesion with respect to one or more types of resins having a hydrocarbon bond, and it is preferable that the type of resin from which the improvement of the adhesion can be obtained increases.

Then, it is preferable that the surface modifier composition according to one embodiment of the present invention further improves adhesion with respect to at least one type of resin selected from the group consisting of preferred resins having a hydrocarbon bond that can be contained in the adherend described above, it is more preferable that the surface modifier composition further improves the adhesion of at least one type selected from the group consisting of PP, PE, SPS, PBT, PPE, PPS, EPDM, or nylon (for example, 6,6-nylon or the like), it is even more preferable that the surface modifier composition further improves the adhesion of at least one type selected from the group consisting of PP, PE, SPS, PBT, PPE, PPS, and nylon (for example, 6,6-nylon or the like), it is still even more preferable that the surface modifier composition further improves the adhesion of PP or PE, from the viewpoint of the type of resin from which a adhesion improvement effect can be obtained.

In addition, among the surface modifier compositions of further improving the adhesion of PP, according to a particularly preferred embodiment of the present invention, the surface modifier composition of further improving the adhesion of PE in addition to PP is preferable, the surface modifier composition of further improving the adhesion of PE, SPS, PBT, PPE, PPS, and nylon (for example, 6,6-nylon or the like) in addition to PP is more preferable, the surface modifier composition of further improving the adhesion of PE, SPS, PBT, PPE, PPS, EPDM, and nylon (for example, 6,6-nylon or the like) in addition to PP is even more preferable, and the surface modifier composition of further improving the adhesion of all resins of the group of the resins having a hydrocarbon bond that can be contained in the adherend described above is particularly preferable, from the viewpoint of the number of resins from which the adhesion improvement effect can be obtained.

<Adhesion Method>

Another aspect of the present invention relates to an adhesion method in which adhesion target surfaces (adhesion surfaces) of one or both of two adherends are subjected to the surface treatment in advance by the surface modifier composition according to one aspect of the present invention, and then, the adhesion of the two adherends is performed by the adhesive agent.

More specifically, an example of this aspect includes an adhesion method of performing a surface treatment by a method including applying the surface modifier composition according to one aspect of the present invention onto adhesion surfaces of one or both of two adherends to form a surface modifier composition coating layer, and heating the surface modifier composition coating layer or irradiating the surface modifier composition coating layer with an active energy ray, and then, of forming an adhesive agent layer by applying an adhesive agent onto at least one of the adhesion surfaces, of pasting the two adherends through the adhesive agent layer such that the adhesion surfaces of the two adherends face each other, and then, of curing the adhesive agent layer, for example by heating the adhesive agent layer or by irradiating the adhesive agent layer with an active energy ray to perform adhesion by the adhesive agent, and the like. In the method, a surface to be coated with the adhesive agent may be an adhesion surface of an adherend subjected to the surface treatment or an adhesion surface of an adherend not subjected to the surface treatment, and the adhesion surface of the adherend subjected to the surface treatment is preferable.

On the other hand, another example of the aspect described above also includes an adhesion method of performing a surface treatment and adhesion due to the curing of an adhesive agent layer at one time by a method including forming a surface modifier composition coating layer by applying the surface modifier composition according to one aspect of the present invention onto adhesion surfaces of one or both of two adherends, and then, forming an adhesive agent layer by applying an adhesive agent onto the surface modifier composition coating layer, and then, pasting the two adherends through the adhesive agent layer such that the adhesion surfaces of the two adherends face each other, and then, performing heating or the irradiation of an active energy ray, and the like.

Note that, in such adhesion methods, it is preferable that at least one adhesion surface of the two adherends contains the hardly adhesive material.

<Coating Method>

A method of applying the surface modifier composition according to one embodiment of the present invention onto the adherend is not particularly limited, and a coating method used in a known sealing agent or adhesive agent can be adopted as the method. For example, a coating method such as dispensing using an automatic coater, spray, ink jet, screen printing, gravure printing, dipping, spin coat can be used as the method. Note that, it is preferable that the surface modifier composition according to one embodiment of the present invention is in the form of a liquid at 25° C. from the viewpoint of coating properties.

<Surface Modification Method>

A surface modification method of the surface modifier composition of the present invention is not particularly limited, but preferably, a surface modification method using heating, the irradiation of an active energy ray, or the like is exemplified.

In a case where the surface modification method is a method using heating, a heating temperature is not particularly limited, but is preferably 50° C. to 250° C., is more preferably 80° C. to 200° C., and is even more preferably 100° C. to 170° C. A heating time is 0.5 minutes to 500 minutes, is more preferably 3 minutes to 90 minutes, and is even more preferably 15 minutes to 60 minutes.

In a case where the surface modification method is a method using the irradiation of the active energy ray, a light source of the active energy ray such as an ultraviolet ray and visible light is not particularly limited, and a known light source can be used as the light source. Examples of the light source include a low-pressure mercury lamp, a medium-pressure mercury lamp, a high-pressure mercury lamp, a super high-pressure mercury lamp, a black light lamp, a microwave excitation mercury lamp, a metal halide lamp, a sodium lamp, a halogen lamp, a xenon lamp, an LED, a fluorescent lamp, solar light, an electron beam irradiation device, and the like. An irradiance of light irradiation is not particularly limited, but is preferably greater than or equal to 10 kJ/m$^2$, and is more preferably greater than or equal to 15 kJ/m$^2$, from the viewpoint of excellent surface modification properties. In addition, an upper limit value of the irradiance of the light irradiation is not particularly limited, but is preferably less than or equal to 60 kJ/m². It is preferable that an object subjected to the surface modification (for example, the adherend) is left to stand for a given length of time, after the irradiation of the active energy ray. A standing temperature is not particularly limited, but is preferably a temperature of 10° C. to 40° C., is more preferably a temperature of 20° C. to 30° C., and is even more preferably a temperature of 20° C. to 25° C. A standing time is not particularly limited, but is preferably 0.5 minutes to 500 minutes, is more preferably 3 minutes to 90 minutes, and is even more preferably 10 minutes to 60 minutes.

<Adhesive Agent>

The adhesive agent that can be used in the adhesion method according to one embodiment of the present invention is not particularly limited, and a known adhesive agent can be used as the adhesive agent. Examples of the adhesive agent include a moisture-curable adhesive agent, an instantaneous adhesive agent, a two-component curable adhesive agent, an anaerobic curable adhesive agent, a heat-curable adhesive agent, an active energy ray-curable adhesive agent, a hot-melt adhesive agent, a pressure-sensitive adhesive agent, an aqueous adhesive agent, and the like. Among them, the heat-curable adhesive agent or the active energy ray-curable adhesive agent is preferable, and the active energy ray-curable adhesive agent is more preferable, from the viewpoint of enabling curing to be performed for a short period of time and of excellent adhesion durability.

Specific examples of the heat-curable adhesive agent or the active energy ray-curable adhesive agent that is a preferred adhesive agent are not particularly limited, and include a heat-curable adhesive agent or an active energy ray-curable adhesive agent, containing a curable vinylic polymer, curable polyether, curable polyester, curable polyurethane, curable polyurea, a curable fluorine polymer, curable polyorganosiloxane, or the like. Among them, the heat-curable adhesive agent containing the curable vinylic polymer or the curable polyorganosiloxane, or the active energy ray-curable adhesive agent, is preferable from the viewpoint of further obtaining the effect of enabling curing to be performed for a short period of time and of excellent adhesion durability.

The curable vinylic polymer is not particularly limited, and preferred examples of the curable vinylic polymer include a curable (meth)acrylic polymer, curable polybutadiene, curable hydrogenerated polybutadiene, curable polyisoprene, curable hydrogenerated polyisoprene, curable polyisobutylene, and the like. That is, in the heat-curable adhesive agent or the active energy ray-curable adhesive agent, containing the curable vinylic polymer, it is preferable that the curable vinylic polymer is at least one or more types selected from the group consisting of a curable (meth)acrylic polymer, curable polybutadiene, curable hydrogenerated polybutadiene, curable polyisoprene, curable hydrogenerated polyisoprene, and curable polyisobutylene. Here, each of the curable (meth)acrylic polymer, the curable polybutadiene, the curable hydrogenerated polybutadiene, the curable polyisoprene, the curable hydrogenerated polyisoprene, and the curable polyisobutylene may be independently used, or two or more types thereof may be used by being mixed. Note that, in the case of an adhesive agent having a structure in which polarity is low, such as the curable polybutadiene, the curable hydrogenerated polybutadiene, the curable polyisoprene, the curable hydrogenerated polyisoprene, and the curable polyisobutylene, there is a tendency that the adhesion with respect to the adherend, in particular, the adherend that is the hardly adhesive material is degraded, but in the case of using the surface modifier composition according to one embodiment of the present invention, it is possible to improve the adhesion.

Here, "curable" in the heat-curable adhesive agent or the active energy ray-curable adhesive agent represents that a compound contained in the adhesive agent has a reactive functional group, for example, a functional group such as a (meth)acryloyl group, an allyl group, a hydrosilyl group, a glycidyl group, a hydrolyzable silyl group, a silanol group, a mercapto group, an amino group, an isocyanate group, a hydroxy group, a cyanate group, an acid anhydride group, a phenol group, and an isocyanurate group, and has properties that the adhesive agent is cured by a reaction relevant to the functional groups. Among them, the (meth)acryloyl group, the allyl group, the glycidyl group, the hydrolyzable silyl group, and the isocyanate group are preferable as the reactive functional group, from the viewpoint of an excellent adhesive force.

The hydrolyzable silyl group is not particularly limited, and examples of the hydrolyzable silyl group include an alkoxysilyl group such as a methoxysilyl group, an ethoxysilyl group, a propoxysilyl group, a butoxysilyl group, a methoxyethoxysilyl group, and an ethoxyethoxysilyl group; an acyloxysilyl group such as an acetoxysilyl group, a propionyloxysilyl group, a butyl carbonyloxysilyl group, and a benzoyloxysilyl group; an alkenyloxysilyl group such as an isopropenyloxysilyl group, an isobutenyloxysilyl group, and a 1-ethyl-2-methyl vinyloxysilyl group; a ketoxime silyl group such as a dimethyl ketoxime silyl group, a methyl ethyl ketoxime silyl group, a diethyl ketoxime silyl group, a cyclopentanoxime silyl group, and a cyclohexanoxime silyl group; an aminosilyl group such as an N-methyl aminosilyl group, an N-ethyl aminosilyl group, an N-propyl aminosilyl group, an N-butyl aminosilyl group, an N,N-dimethyl aminosilyl group, an N,N-diethyl aminosilyl group, and an N-cyclohexyl aminosilyl group; an amide silyl group such as an N-methyl acetoamide silyl group, an N-ethyl acetoamide silyl group, and an N-methyl benzamide silyl group; an aminooxysilyl group such as an N,N-dimethyl aminooxysilyl group and an N,N-diethyl aminooxysilyl group, and the like.

The heat-curable adhesive agent or the active energy ray-curable adhesive agent may contain additives used in the known adhesive agent, such as a cross-linking agent, a catalyst, a curing agent, a coloring agent, a filler, a flame retarder, a reaction diluent (for example, isobonyl methacrylate or the like), a plasticizer, an antioxidant, an antifoaming agent, a coupling agent, a leveling agent, and a rheology control agent, within a range not impairing the properties of the present invention.

The heat-curable adhesive agent containing the curable vinylic polymer is not particularly limited, and examples of the heat-curable adhesive agent containing the curable vinylic polymer include a composition containing a (meth)acrylic polymer, polybutadiene, hydrogenerated polybutadiene, polyisoprene, hydrogenerated polyisoprene or polyisobutylene, having an allyl group, a hydrosilyl compound, and a hydrosilylation catalyst; a composition containing a (meth)acrylic polymer, polybutadiene, hydrogenerated polybutadiene, polyisoprene, hydrogenerated polyisoprene or polyisobutylene, having a (meth)acryloyl group, and a thermal radical initiator; a heat-curable adhesive agent containing a (meth)acrylic polymer, polybutadiene, hydrogenerated polybutadiene, polyisoprene, hydrogenerated polyisoprene or polyisobutylene, having a glycidyl group, and a thermal cationic initiator, and the like.

The active energy ray-curable adhesive agent containing the curable vinylic polymer is not particularly limited, and examples of the active energy ray-curable adhesive agent containing the curable vinylic polymer include an active energy ray-curable adhesive agent containing a (meth) acrylic polymer, polybutadiene, hydrogenerated polybutadiene, polyisoprene, and hydrogenerated polyisoprene or polyisobutylene, having a (meth)acryloyl group (for example, a polyisobutylene polymer having an acryloyloxyethoxyphenyl group, or the like), and a photoradical initiator (for example, 2-hydroxy-2-methyl-1-phenyl-propan-1-one or the like); an active energy ray-curable adhesive agent containing a polyisobutylene polymer or a (meth)acrylic polymer, having a glycidyl group, and a photocationic initiator; an active energy ray-curable adhesive agent containing a (meth)acrylic polymer, polybutadiene, hydrogenerated polybutadiene, polyisoprene, hydrogenerated polyisoprene or polyisobutylene, having a glycidyl group, and a photocationic initiator, and the like.

The heat-curable adhesive agent containing the curable polyorganosiloxane is not particularly limited, and examples of the heat-curable adhesive agent containing the curable polyorganosiloxane include a composition containing polyorganosiloxane having an allyl group, a hydrosilyl compound, and a hydrosilylation catalyst; a composition containing polyorganosiloxane having a (meth)acryloyl group, and a thermal radical initiator; an active energy ray-curable adhesive agent containing polyorganosiloxane having a glycidyl group, and a thermal cationic initiator, and the like.

The active energy ray-curable adhesive agent containing the curable polyorganosiloxane is not particularly limited, and examples of the active energy ray-curable adhesive agent containing the curable polyorganosiloxane include a composition containing polyorganosiloxane having an allyl group, a hydrosilyl compound, and a photoactive hydrosilylation catalyst; a composition containing polyorganosiloxane having a (meth)acryloyl group, and a photoradical initiator; an active energy ray-curable adhesive agent containing polyorganosiloxane having a glycidyl group, and a photocationic initiator, and the like.

Among them, preferred examples of the heat-curable adhesive agent or the active energy ray-curable adhesive agent include a composition containing a polyisobutylene-based resin (a polyisobutylene resin composition), a composition containing a poly(meth)acrylic resin (a poly(meth) acrylic resin composition), a composition containing a silicone resin (a silicone resin composition), and the like.

A synthetic product may be used as the adhesive agent, or a commercially available product may be used. Examples of the commercially available product of the heat-curable adhesive agent include ThreeBond 1152C, ThreeBond 1156B, and ThreeBond 1234B (manufactured by ThreeBond Holdings Co., Ltd.), and the like.

Each of the adhesive agents may be independently used, or two or more types thereof may be used by being mixed.
<Application>

The application of the surface modifier composition according to one embodiment of the present invention, and the adhesion method using the surface modifier composition according to another embodiment of the present invention is not particularly limited, and the surface modifier composition and the adhesion method can be used in various fields. A specific application includes adhesion, sealing, cast molding, molding, a coating material, and the like of switch parts for a vehicle, a headlamp, parts in an engine, electric parts, a driving engine, a brake oil tank, a body panel such as a front hood, a fender, and a door, a window, and the like, in a vehicle and transport plane field; adhesion, sealing, cast molding, molding, a coating material, and the like of a liquid crystal display, an organic electroluminescence, a light emitting diode display device, and a field emission display, in a flat panel display; adhesion, sealing, cast molding, molding, a coating material, and the like of a video disk, a CD, a DVD, an MD, a pickup lens, a hard disk periphery (members for a spindle motor, members for a magnetic head actuator, and the like), a Blu-ray Disc, and the like, in a recording field; a sealing material of an electronic part, an electric circuit, an electric contact, a semiconductor element, and the like, a die bond agent, a conductive adhesive agent, an anisotropic conductive adhesive agent, an interlayer adhesive agent of a multi-layer substrate including a build-up substrate, a solder resist, and the like, in an electronic material field; adhesion, sealing, cast molding, molding, a coating material, and the like of a lithium battery, a manganese battery, an alkali battery, a nickel-based battery, a fuel battery, a silicon-based solar battery, a dye-sensitized solar battery, an organic solar battery, and the like, in a battery field; adhesion, sealing, cast molding, molding, a coating material, and the like of an optical switch periphery in an optical communication system, an optical fiber material of an optical connector periphery, optical passive parts, optical circuit parts, a photoelectronic integrated circuit periphery, or the like, in an optical part field; adhesion, sealing, cast molding, molding, and a coating material of a camera module, a lens material for a still camera, a finder prism, a target prism, a finder cover, a light receiving sensor part, a photographing lens, a projection lens of a projection television, and the like, in an optical instrument field; and adhesion, a lining agent, sealing, cast molding, molding, a coating material, and the like of a gas pipe, a water pipe, and the like, in an infrastructure field.

A resin used in the vehicle and transport plane field is not particularly limited, and examples of the resin include PP (polypropylene), PE (polyethylene), polyurethane, ABS, a phenol resin, CFRP (carbon fiber reinforced plastic), GFRP (glass fiber reinforced plastic), and the like. In particular, the CFRP (the carbon fiber reinforced plastic) and the GFRP (the glass fiber reinforced plastic) are used in a vehicle body. It is possible to perform the surface modification with respect to such a member by the surface modifier composition according to one embodiment of the present invention, in order to improve in advance the adhesion.

In general, the frame of an electrolyte film of the fuel battery is configured of the hardly adhesive material such as PP and PEN. It is possible to perform the surface modification with respect to such a member by the surface modifier composition according to one embodiment of the present invention, in order to improve in advance the adhesion.

A spot between an image sensor such as a CMOS and a CCD and a substrate, a spot between a cutoff filter and a substrate, a spot between a substrate and a housing, a spot between a housing and a cutoff filter, a spot between a housing and a lens unit, and the like are exemplified as an adhesion spot of the camera module. In general, the material of the housing or the lens unit is the hardly adhesive material such as an LCP (a liquid crystal polymer), PPS (polyphenylene sulfide), and polycarbonate. It is possible to perform the surface modification with respect to such a member by the surface modifier composition according to one embodiment of the present invention, in order to improve in advance the adhesion.

Accordingly, still another aspect of the present invention relates to a member including an adherend containing a resin having a hydrocarbon bond, which is subjected to the surface modification by the surface modifier composition according to one aspect of the present invention. Here, it is preferable that the adherend containing the resin having a hydrocarbon bond is an adherend formed of the resin having a hydrocarbon bond. In addition, still another aspect of the present invention relates to a member including two adherends that adhere to each other by the adhesion method according to one aspect of the present invention.

EXAMPLES

Hereinafter, the present invention will be described in detail by examples. However, the present invention is not limited to the following examples.

<Preparation of Surface Modifier Composition Capable of being Subjected to Surface Modification by Irradiation of Active Energy Ray>

Each component was sampled in parts by mass shown in Table 1 described below, and was mixed by a stirrer (a mixer) at a normal temperature (25° C.) for 60 minutes under a light-shielded condition, and thus, a surface modifier composition was prepared. Then, various physical properties were measured with respect to each of the surface modifier compositions that were obtained, and a surface modification effect was evaluated as follows. Note that, the surface modifier compositions were in the form of a liquid at 25° C.

[(A) Component]

a1: Benzophenone (Benzophenone-Based Photoradical Polymerization Initiator, manufactured by Wako Pure Chemical Industries, Ltd., Reagent), a2: 2,4-Diethyl Thioxanthone (Thioxanthone-Based Photoradical Polymerization Initiator, manufactured by Nippon Kayaku Co., Ltd., KAYACURE (Registered Trademark) DETXS), a3: Methyl Benzoylformate (manufactured by Lambson Ltd., SPEEDCUREMBF).

[Comparative Component of (A) Component]

a'1: 2,4,6-Trimethyl Benzoyl-Diphenyl-Phosphine Oxide (manufactured by BASF SE, IRGACURE (Registered Trademark) TPO), a'2: 2-Hydroxy-2-Methyl-1-Phenyl-Propan-1-One (manufactured by BASF SE, IRGACURE (Registered Trademark) 1173).

[(B) Component]

b1: 3-Methacryloxypropyl Trimethoxysilane (manufactured by Shin-Etsu Chemical Co., Ltd., KBM-503)

b2: Vinyl Trimethoxysilane (manufactured by Shin-Etsu Chemical Co., Ltd., KBM-1003), b3: 3-Mercapto Propyl Methyl Dimethoxysilane (manufactured by Shin-Etsu Chemical Co., Ltd., KBM-802).

[(C) Component]

c1-1: Hydrolysis Condensation Oligomer of Tetraethoxysilane in Which $R^1$ of General Formula 1 Is ethyl group and n Is 5 (manufactured by COLCOAT CO., LTD., Ethyl Silicate 40), c1-2: Hydrolysis Condensation Oligomer of Tetramethoxysilane in Which $R^1$ of General Formula 1 Is methyl group and n Is 4 (manufactured by COLCOAT CO., LTD., Methyl Silicate 51), c2-1: Tetranormal Butoxytitanium (Normal-Tetrabutoxytitanium).

[(D) Component]

d1: Ethyl Cyclohexane.

<Adhesion Test 1 of Hardly Adhesive Member after Surface Modification>

[Adhesive Agent]

Heat-Curable Adhesive Agent 1

A heat-curable polyisobutylene resin composition (manufactured by ThreeBond Holdings Co., Ltd., ThreeBond 1152C) was set to a heat-curable adhesive agent 1.

[Evaluation Method]

Each of the surface modifier compositions shown in Table 1 described below was homogeneously applied onto an adhesion target surface (an adhesion surface) of each adherend described below (a dimension of Length of 100 mm×Width of 25 mm×Thickness of 1 mm), and thus, a surface modifier composition coating layer was formed on the adhesion surface. Next, the surface modifier composition coating layer was irradiated with an ultraviolet ray of a cumulative light amount of 30 kJ/m$^2$ by an ultraviolet ray irradiator using a high-pressure mercury lamp, and then, was left to stand for 60 minutes under an environment of 25° C., and thus, the surface modification of each of the adherends was performed. As described above, two identical adherends subjected to the surface modification were prepared with respect to each combination of each of the adherends and each of the compositions for surface treatment.

Subsequently, in each of the combinations, one adherend subjected to the surface modification of the two identical adherends subjected to the surface modification was used, and the heat-curable adhesive agent 1 (the heat-curable polyisobutylene resin composition) was homogeneously applied onto an adhesion surface subjected to the surface modification such that an adhesion area was 25 mm×10 mm, and thus, an adhesive agent layer was formed, and then, the other adherend subjected to the surface modification was pasted through the adhesive agent layer such that the adhesion surfaces of the two adherends faced each other, and was fixed with a fixing jig. After that, the two adherends pasted through the adhesive agent layer, in a state of being fixed with the fixing jig, were heated and cured for 1 hour in an atmosphere of 130° C., and thus, each test piece was prepared.

Then, a tension test was performed in a condition of a tension rate of 50 mm/min, on the basis of JIS K 6850 (1999), by using each of the test pieces. A destruction state of the adhesion surface of the test piece after the tension test was observed and evaluated on the basis of evaluation standards described below. The results are shown in Table 1 described below. Note that, "-" in Table 1 indicates that the test was not performed.

[Material of Adherend]

PP (Polypropylene), PE (Polyethylene), SPS (Syndiotactic Polystyrene), PBT (Polybutylene Terephthalate), PPE (Polyphenylene Ether), Nylon (6,6-Nylon), PPS (Polyphenylene sulfide), and EPDM (Ethylene Propylene Diene Rubber).

[Evaluation Standards]

CF (Cohesive Failure): The destruction state of the adhesion surface of the test piece was an aggregation destruction state, and adhesion on the interface between the adhesive agent and the adherend was sufficient.

AF (Adhesive Failure): The destruction state of the adhesion surface of the test piece was in an interface destruction state, and the adhesion on the interface between the adhesive agent and the adherend was insufficient.

TABLE 1

| Component | | Example 1 | Example 2 | Example 3 | Example 4 | Example 5 | Example 6 | Example 7 | Example 8 |
|---|---|---|---|---|---|---|---|---|---|
| a1 | | 1 | 0 | 0 | 0 | 1 | 1 | 1 | 1 |
| a2 | | 0 | 1 | 0 | 0 | 0 | 0 | 0 | 0 |
| a3 | | 0 | 0 | 1 | 1 | 0 | 0 | 0 | 0 |
| a'1 | | 0 | 0 | 0 | 0 | 0 | 0 | 0 | 0 |
| a'2 | | 0 | 0 | 0 | 0 | 0 | 0 | 0 | 0 |
| b1 | | 2 | 2 | 2 | 2 | 0 | 0 | 2 | 2 |
| b2 | | 0 | 0 | 0 | 0 | 2 | 0 | 0 | 0 |
| b3 | | 0 | 0 | 0 | 0 | 0 | 2 | 0 | 0 |
| c1-1 | | 1 | 1 | 1 | 0 | 1 | 1 | 0 | 1 |
| c1-2 | | 0 | 0 | 0 | 1 | 0 | 0 | 0 | 0 |
| c2-1 | | 3 | 3 | 3 | 3 | 3 | 3 | 3 | 0 |
| d1 | | 46 | 46 | 46 | 46 | 46 | 46 | 46 | 46 |
| Adhesive agent composition | Hardly adhesive member | | | | Evaluation result | | | | |
| Heat-curable adhesive agent composition 1 (Heat-curable polyisobutylene resin composition) | PP | CF | CF | CF | CF | CF | CF | CF | CF |
| | PE | CF | CF | CF | CF | CF | CF | CF | CF |
| | SPS | CF | CF | CF | CF | CF | CF | CF | CF |
| | PBT | CF | CF | CF | CF | CF | CF | CF | CF |
| | PPE | CF | CF | CF | CF | CF | CF | CF | CF |
| | Nylon | CF | CF | CF | CF | CF | CF | CF | CF |
| | PPS | CF | CF | CF | CF | CF | CF | CF | CF |
| | EPDM | CF | — | — | — | — | — | — | — |

| Component | | Example 9 | Example 10 | Comparative Example 1 | Comparative Example 2 | Comparative Example 3 | Comparative Example 4 | Comparative Example 5 |
|---|---|---|---|---|---|---|---|---|
| a1 | | 1 | 1 | 0 | 0 | 1 | 0 | 1 |
| a2 | | 0 | 0 | 0 | 0 | 0 | 0 | 0 |
| a3 | | 0 | 0 | 0 | 0 | 0 | 0 | 0 |
| a'1 | | 0 | 0 | 1 | 0 | 0 | 0 | 0 |
| a'2 | | 0 | 0 | 0 | 1 | 0 | 0 | 0 |
| b1 | | 2 | 2 | 2 | 2 | 0 | 0 | 0 |
| b2 | | 0 | 0 | 0 | 0 | 0 | 0 | 0 |
| b3 | | 0 | 0 | 0 | 0 | 0 | 0 | 2 |
| c1-1 | | 0.2 | 3 | 1 | 1 | 1 | 1 | 0 |
| c1-2 | | 0 | 0 | 0 | 0 | 0 | 0 | 0 |
| c2-1 | | 3 | 3 | 3 | 3 | 3 | 3 | 0 |
| d1 | | 46 | 46 | 46 | 46 | 46 | 46 | 0 |
| Adhesive agent composition | Hardly adhesive member | | | | Evaluation result | | | |
| Heat-curable adhesive agent composition 1 (Heat-curable polyisobutylene resin composition) | PP | CF | CF | AF | AF | AF | AF | AF |
| | PE | CF | CF | AF | AF | AF | AF | AF |
| | SPS | CF | CF | AF | AF | AF | AF | CF |
| | PBT | CF | CF | — | — | — | — | — |
| | PPE | CF | CF | — | — | — | — | — |
| | Nylon | CF | CF | AF | AF | AF | AF | CF |
| | PPS | CF | CF | — | — | — | — | — |
| | EPDM | — | — | — | — | AF | — | — |

According to the surface modifier compositions according to Examples 1 to 10 of Table 1 described above, and the adhesion method using the same, it was checked that it was possible to perform the surface modification of various types of hardly adhesive materials such as PP and to improve the adhesion.

On the other hand, each of Comparative Examples 1 and 2 related to a surface treatment agent composition using 2,4,6-trimethyl benzoyl-diphenyl-phosphine oxide and 2-hydroxy-2-methyl-1-phenyl-propan-1-one, which were not the hydrogen abstraction type radical initiator, instead of the (A) component, but had poor adhesion in PP, PE, SPS, and nylon.

In addition, Comparative Example 3 related to a surface treatment agent composition not containing the (B) component, but had poor adhesion in PP, PE, SPS, nylon, and EPDM.

Then, Comparative Example 4 related to a surface treatment agent composition not containing the (A) component and the (B) component, but had poor adhesion in PP, PE, SPS, and nylon.

In addition, Comparative Example 5 related to a surface treatment agent composition not containing the (C) component, but had poor adhesion in PP and PE.

<Adhesion Test 2 of Hardly Adhesive Member after Surface Modification>

[Adhesive Agent]

It was checked whether or not the surface modifier of the present invention was effective even in other types of adhesive agents in addition to the heat-curable adhesive agent 1 (the heat-curable polyisobutylene resin composition).

Heat-Curable Adhesive Agent 2

A heat-curable polyacrylic resin composition (manufactured by ThreeBond Holdings Co., Ltd., ThreeBond 1156B) was set to a heat-curable adhesive agent 2.

Heat-Curable Adhesive Agent 3

A heat-curable silicone resin composition (manufactured by ThreeBond Holdings Co., Ltd., ThreeBond 1234B) was set to a heat-curable adhesive agent 3.

Active Energy Ray-Curable Adhesive Agent 1

An active energy ray-curable adhesive agent 1 (an active energy ray-curable polyisobutylene resin composition) was prepared by the following method.

(Manufacturing of Polyisobutylene Polymer Having Acryloyloxyethoxyphenyl Group)

A vessel of a separable flask of 5 L was subjected to nitrogen substitution, and then, 200 mL of n-hexane and 2000 mL of butyl chloride were added thereto, and were cooled to −70° C. while being stirred under a nitrogen atmosphere. Next, 840 mL (9 mol) of isobutylene, 12 g (0.05 mol) of p-dicumyl chloride, and 1.1 g (0.012 mol) of 2-methyl pyridine were added. A reaction mixture was cooled to −70° C., and then, 5.0 mL (0.05 mol) of titanium tetrachloride was added, and polymerization was started. In 3 hours after the polymerization was started, 40 g of phenoxyethyl acrylate (Lightacrylate PO-A, manufactured by Kyoeisha Chemical Co., Ltd.) and 110 ml of titanium tetrachloride were added. After that, stirring was continuously performed at −70° C. for 4 hours, and then, 1000 ml of methanol was added, and the reaction was stopped. Subsequently, a supernatant solution was separated from a reaction solution, and a solvent or the like was removed from the separated supernatant solution, and then, a product material was dissolved in 3000 ml of n-hexane to be a solution. The solution was washed with water three times by using 3000 ml of pure water. Then, methanol was added to the solution after being washed with water, and the product material was reprecipitated from methanol, and then, a solvent was removed under reduced pressure, and the obtained product material (a polymer) was subjected to vacuum drying at 80° C. for 24 hours, and thus, a polyisobutylene polymer having an acryloyloxyethoxyphenyl group represented by Formula (2) described below was obtained:

[Chemical formula 2]

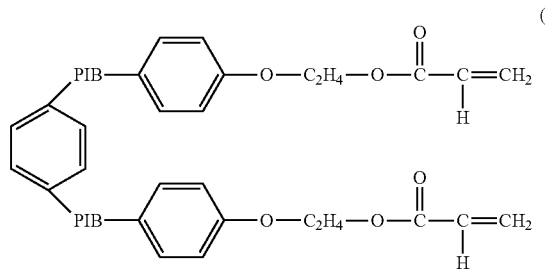

In Formula (2) described above, PIB is a polymer having a polyisobutylene structure.

(Preparation of Active Energy Ray-Curable Adhesive Agent (Active Energy Ray-Curable Polyisobutylene Resin Composition))

100 parts by mass of the polyisobutylene polymer having an acryloyloxyethoxyphenyl group represented by Formula (2) described above, 3 parts by mass of 2-hydroxy-2-methyl-1-phenyl-propan-1-one (IRGACURE (Registered Trademark) 1173, manufactured by BASF SE), as a photoinitiator, and 50 parts by mass of isobornyl methacrylate (SR423, manufactured by Sartomer Company Inc.), as a reactive diluent, were added, and were mixed at a normal temperature for 60 minutes under a light-shielded condition by a planetary mixer, and thus, the active energy ray-curable adhesive agent 1 was obtained.

[Evaluation Method]

The surface modifier composition according to Example 1 of Table 1 was homogeneously applied onto an adhesion target surface (an adhesion surface) of each adherend described below (a dimension of Length of 100 mm×Width of 25 mm×Thickness of 1 mm), and thus, a surface modifier composition coating layer was formed on the adhesion surface. Next, the surface modifier composition coating layer was irradiated with an ultraviolet ray of a cumulative light amount of 30 kJ/m$^2$ by an ultraviolet ray irradiator using a high-pressure mercury lamp, and then, was left to stand for 60 minutes under an environment of 25° C., and thus, the surface modification of each of the adherends was performed. As described above, two identical adherends subjected to the surface modification were prepared with respect to each combination of each of the adherends and the composition for surface treatment according to Example 1.

Subsequently, in each of the combinations, one adherend subjected to the surface modification of the two identical adherends subjected to the surface modification was used, and the heat-curable adhesive agent 2 (the heat-curable polyacrylic resin composition), the heat-curable adhesive agent composition 3 (the heat-curable silicone resin composition), and the active energy ray-curable adhesive agent 1 (the active energy ray-curable polyisobutylene resin composition) were respectively homogeneously applied onto an adhesion surface subjected to the surface modification such that an adhesion area was 25 mm×10 mm, and thus, an adhesive agent layer was formed, and then, the other adherend subjected to the surface modification was pasted through the adhesive agent layer such that the adhesion surfaces of the two adherends faced each other, and was fixed with a fixing jig. After that, in the case of the heat-curable adhesive agents 2 and 3, the two adherends pasted through the adhesive agent layer, in a state of being fixed with the fixing jig, were heated and cured for 1 hour in an atmosphere of 130° C., and thus, each test piece was prepared. In addition, in the case of the active energy ray-curable adhesive agent 1, the two adherends pasted through the adhesive agent layer, in a state of being fixed with the fixing jig were cured by being irradiated with an ultraviolet ray of a cumulative light amount of 45 kJ/m$^2$ by an ultraviolet ray irradiator using a high-pressure mercury lamp, and thus, each test piece was prepared.

Then, a tension test was performed in a condition of a tension rate of 50 mm/min, on the basis of JIS K 6850 (1999), by using each of the test pieces. A destruction state of the adhesion surface of the test piece after the tension test was observed and evaluated on the basis of evaluation standards described below. The results are shown in Table 2 described below.

[Material of Adherend]

PP (polypropylene), PE (polyethylene), SPS (syndiotactic polystyrene), PBT (polybutylene terephthalate), PPE (polyphenylene ether), nylon (6,6-nylon), PPS (polyphenylene sulfide), and EPDM.

[Evaluation Standards]

CF (Cohesive Failure): The destruction state of the adhesion surface of the test piece was an aggregation destruction state, and adhesion on the interface between the adhesive agent and the adherend was sufficient.

AF (Adhesive Failure): The destruction state of the adhesion surface of the test piece was in an interface destruction state, and the adhesion on the interface between the adhesive agent and the adherend was insufficient.

TABLE 2

| Adhesive agent composition | Hardly adhesive member | Evaluation result |
| --- | --- | --- |
| Heat-curable adhesive agent composition 2 (Heat-curable polyacrylic resin composition) | PP | CF |
| | PE | CF |
| | SPS | CF |
| | PBT | CF |
| | PPE | CF |
| | Nylon | CF |
| | PPS | CF |
| | EPDM | CF |
| Heat-curable adhesive agent composition 3 (Heat-curable silicone resin composition) | PP | CF |
| | PE | CF |
| | SPS | CF |
| | PBT | CF |
| | PPE | CF |
| | Nylon | CF |
| | PPS | CF |
| | EPDM | CF |
| Active energy ray-curable adhesive agent composition 1 | PP | CF |
| | PE | CF |
| | SPS | CF |
| | PBT | CF |
| | PPE | CF |
| | Nylon | CF |
| | PPS | CF |
| | EPDM | CF |

According to the surface modifier composition according to Example 1 of Table 2 described above and the adhesion method using the same, it was checked that the present invention was effective even in the heat-curable adhesive agent 2 (the heat-curable polyacrylic resin composition), the heat-curable adhesive agent 3 (the heat-curable silicone resin composition), and the active energy ray-curable adhesive agent 1 (the active energy ray-curable polyisobutylene resin composition) that were other types of adhesive agents in addition to the heat-curable adhesive agent 1 (the heat-curable polyisobutylene resin composition), and it was possible to perform the surface modification of various types of hardly adhesive materials such as PP and to improve the adhesion. Accordingly, it was checked that the surface modifier composition of the present invention, and the adhesion method using the same were effective regardless of the type of adhesive agent.

<Adhesion Test 3 (Reference Example) of Hardly Adhesive Member after Surface Modification>
[Evaluation Method]

The surface modifier composition according to Example 1 of Table 1 was homogeneously applied onto an adhesion target surface (an adhesion surface) of a polytetrafluoroethylene adherend (a dimension of Length of 100 mm×Width of 25 mm×Thickness of 1 mm), and thus, a surface modifier composition coating layer was formed on the adhesion surface. Next, the surface modifier composition coating layer was irradiated with an ultraviolet ray of a cumulative light amount of 30 kJ/m² by an ultraviolet ray irradiator using a high-pressure mercury lamp, and then, was left to stand for 60 minutes under an environment of 25° C., and thus, the surface modification was performed. As described above, two adherends subjected to the surface modification were prepared.

Subsequently, one adherend subjected to the surface modification of the two adherends subjected to the surface modification was used, and the heat-curable adhesive agent 1 (the heat-curable polyisobutylene resin composition) was homogeneously applied onto an adhesion surface subjected to the surface modification such that an adhesion area was 25 mm×10 mm, and thus, an adhesive agent layer was formed, and then, the other adherend subjected to the surface modification was pasted through the adhesive agent layer such that the adhesion surfaces of the two adherends faced each other, and was fixed with a fixing jig. After that, the two adherends pasted through the adhesive agent layer, in a state of being fixed with the fixing jig, were heated and cured for 1 hour in an atmosphere of 130° C., and thus, a test piece was prepared.

Then, a tension test was performed in a condition of a tension rate of 50 mm/min, on the basis of JIS K 6850 (1999), by using the test piece.

A destruction state of the adhesion surface of the test piece after the tension test was observed, and thus, the destruction state of the adhesion surface of the test piece was an interface destruction state, and adhesion on the interface between the adhesive agent and the adherend was insufficient. It is assumed that the reason that the adhesion is insufficient is because the polytetrafluoroethylene does not have a hydrocarbon bond, and thus, the abstraction of hydrogen from the base material surface by the (A) component: the hydrogen abstraction type radical initiator of the surface modifier composition according to Example 1 does not occur.

<Preparation of Surface Modifier Composition Capable of being Subjected to Surface Modification by Heating>

1 part by mass of a4: t-butyl (2-ethyl hexanoyl) peroxide (PERBUTYL (Registered Trademark) 0, manufactured by NOF CORPORATION), which was the (A) component, 2 parts by mass of b1: 3-methacryloxypropyl trimethoxysilane (KBM-503, manufactured by Shin-Etsu Chemical Co., Ltd.), which was the (B) component, 1 part by mass of c1-1: a hydrolysis condensation oligomer of tetraethoxysilane (Ethyl Silicate 40, manufactured by COLCOAT CO., LTD.) and 3 parts by mass of c2-1: normal-tetrabutoxytitanium, which were the (C) component, and 46 parts by mass of d1: ethyl cyclohexane, which was the (D) component, were added, and were mixed at a normal temperature (25° C.) for 60 minutes under a light-shielded condition by a stirrer (a mixer), and thus, a surface modifier composition of Example 11 was obtained. Then, various physical properties were measured with respect to the surface modifier composition that was obtained, and a film formation time and a surface modification effect were evaluated as follows. Note that, the surface modifier compositions were in the form of a liquid at 25° C.

<Adhesion Test 4 of Hardly Adhesive Member after Surface Modification>
[Evaluation Method]

The surface modifier composition according to Example 11 was homogeneously applied onto an adhesion target surface (an adhesion surface) of a PP (polypropylene) adherend (a dimension of Length of 100 mm×Width of 25 mm×Thickness of 1 mm), and thus, a surface modifier composition coating layer was formed on the adhesion surface. Next, a laminated body of the adherend and the surface modifier composition coating layer was left to stand for 60 minutes under an environment of 150° C., and thus, the surface modification was performed. As described above, two adherends subjected to the surface modification were prepared.

Subsequently, one adherend subjected to the surface modification of the two adherends subjected to the surface modification was used, and the heat-curable adhesive agent 1 (the heat-curable polyisobutylene resin composition) was homogeneously applied onto an adhesion surface subjected to the surface modification such that an adhesion area was 25 mm×10 mm, and thus, an adhesive agent layer was formed, and then, the other adherend was pasted, and was fixed with a fixing jig. After that, the two adherends pasted through the adhesive agent layer, in a state of being fixed with the fixing jig, were heated and cured for 1 hour in an atmosphere of 130° C., and thus, a test piece was prepared.

Then, a tension test was performed in a condition of a tension rate of 50 mm/min, on the basis of JIS K 6850 (1999), by using the test piece.

A destruction state of the adhesion surface of the test piece after the tension test was observed, and thus, the destruction state of the adhesion surface of the test piece was an aggregation destruction state, and adhesion on the interface between the adhesive agent and the adherend was sufficient.

<Evaluation of Film Formation Time of Surface Modifier Composition>

[Evaluation Method]

The surface modifier compositions according to Examples 1, 7, and 8 were respectively homogeneously applied onto one surface of a PP (polypropylene) adherend (a dimension of Length of 100 mm×Width of 25 mm×Thickness of 1 mm), and thus, a surface modifier composition coating layer was formed. Next, the surface modifier composition coating layer was irradiated with an ultraviolet ray of a cumulative light amount of 30 kJ/m$^2$ by an ultraviolet ray irradiator using a high-pressure mercury lamp, and then, was left to stand for a given length of time under an environment of 25° C., and then, a contact test with respect to the surface modifier composition coating layer was performed, and thus, a film formation time of each of the surface modifier compositions was measured. Here, the film formation time is a time during which the surface modifier composition is not attached to a polytetrafluoroethylene rod by bringing the polytetrafluoroethylene rod into contact with the surface modifier composition coating layer, every 5 minutes.

As a result thereof, the film formation time of the surface modifier composition according to Example 1 in which the (C1) component and the (C2) component were used together, as the (C) component was 15 minutes, the film formation time of the surface modifier composition according to Example 8 in which only the (C1) component was used as the (C) component was 25 minutes, and the film formation time of the surface modifier composition according to Example 7 in which only the (C2) component was used as the (C) component was 50 minutes.

INDUSTRIAL APPLICABILITY

The surface modifier composition according to the present invention, and the adhesion method using the same are capable of performing the surface modification of various types of hardly adhesive materials, and to improve the adhesion, and thus, are industrially useful.

This patent application is based on Japanese Patent Application No. 2017-195896, filed on Oct. 6, 2017, and the entire disclosure of which is hereby incorporated by reference herein.

The invention claimed is:

1. A surface modifier composition, comprising:
an (A) component: a hydrogen abstraction type radical initiator;
a (B) component: a silane compound having a hydrolyzable silyl group, and one or more functional groups which are at least one type of functional group selected from the group consisting of radical polymerizable functional groups and mercapto groups; and
a (C) component containing a (C1) silane compound represented by Formula 1 described below and at least one (C2) condensation reaction catalyst selected from the group consisting of a tin catalyst, a zirconium catalyst, a zinc catalyst, titanium tetranormal butoxide, a titanium butoxide dimer, titanium tetra-2-ethyl hexoxide, a chelate-based titanium complex, and an acylate-based titanium complex,
wherein the surface modifier composition is used in surface modification of an adherend containing a resin having a hydrocarbon bond, and

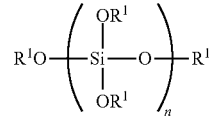

Formula 1 wherein n represents an integer of 1 to 10, and R$^1$s each independently represent an alkyl group having 1 to 20 carbon atoms.

2. The surface modifier composition according to claim 1, wherein the (C2) condensation reaction catalyst is at least one catalyst selected from the group consisting of a tin catalyst, titanium tetranormal butoxide, a titanium butoxide dimer, titanium tetra-2-ethyl hexoxide, a chelate-based titanium complex, and an acylate-based titanium complex.

3. The surface modifier composition according to claim 1, wherein the (A) component is a hydrogen abstraction type photoradical initiator.

4. The surface modifier composition according to claim 1, wherein the (A) component is one or more selected from the group consisting of a benzophenone-based photoradical polymerization initiator, an aminobenzophenone-based photoradical polymerization initiator, a thioxanthone-based photoradical polymerization initiator, and methyl benzoylformate.

5. The surface modifier composition according to claim 1, wherein the surface modifier composition contains the (C) component in a range of greater than or equal to 0.05 parts by mass and less than or equal to 50 parts by mass, with respect to 1 part by mass of the (B) component.

6. The surface modifier composition according to claim 1, further comprising a solvent as a (D) component.

7. The surface modifier composition according to claim 1, wherein the resin having a hydrocarbon bond includes at least one selected from the group consisting of PP (polypropylene), PE (polyethylene), PET (polyethylene terephthalate), SPS (syndiotactic polystyrene), PEN (polyethylene naphthalate), PBT (polybutylene terephthalate), PPE (polyphenylene ether), PPS (polyphenylene sulfide), EPDM (ethylene propylene diene rubber), an LCP (a liquid crystal polymer), a cycloolefin polymer, PC (polycarbonate), 6,6-nylon, polyacetal, polyamide, polyvinyl chloride, and a silicone resin.

8. The surface modifier composition according to claim 1, wherein the surface modifier composition contains the (B) component in a range of greater than or equal to 0.01 parts by mass and less than or equal to 500 parts by mass, with respect to 1 part by mass of the (A) component.

9. An adhesion method, comprising:
performing a surface treatment by a method including applying the surface modifier composition according to claim 1 onto adhesion target surfaces of one or both of two adherends to form a surface modifier composition coating layer, and heating the surface modifier composition coating layer or irradiating the surface modifier composition coating layer with an active energy ray; and then forming an adhesive agent layer by applying an adhesive agent onto at least one of the adhesion target surfaces, pasting the two adherends through the adhesive agent layer such that the adhesion target surfaces of the two adherends face each other, and then, curing the adhesive agent layer by heating the adhesive agent layer or by irradiating the adhesive agent layer with an active energy ray.

10. The adhesion method according to claim 9, wherein the adhesive agent is a heat-curable adhesive agent containing a curable vinylic polymer or curable polyorganosiloxane, or an active energy ray-curable adhesive agent.

11. The adhesion method according to claim 10, wherein the curable vinylic polymer is at least one or more types selected from the group consisting of a curable (meth)acrylic polymer, curable polybutadiene, curable hydrogenerated polybutadiene, curable polyisoprene, curable hydrogenerated polyisoprene, and curable polyisobutylene.

12. A member comprising an adherend containing a resin having a hydrocarbon bond, wherein the adherend has been subjected to surface modification by the surface modifier composition according to claim 1.

* * * * *